United States Patent
Narsian et al.

(10) Patent No.: US 12,495,008 B2
(45) Date of Patent: Dec. 9, 2025

(54) LIVE MIGRATION OF BARE-METAL INSTANCES THAT ARE BACKED BY SDN APPLIANCES

(71) Applicant: Microsoft Technology Licensing, LLC, Redmond, WA (US)

(72) Inventors: Anish Sagar Narsian, Cupertino, CA (US); Jiatong Wang, San Jose, CA (US); Jonathan Paul Rosenberg, Redmond, WA (US); Tao Deng, Campbell, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 18/620,431

(22) Filed: Mar. 28, 2024

(65) Prior Publication Data
US 2025/0310273 A1 Oct. 2, 2025

(51) Int. Cl.
*H04L 47/78* (2022.01)
*G06F 9/455* (2018.01)
(Continued)

(52) U.S. Cl.
CPC ........ *H04L 47/762* (2013.01); *G06F 9/45558* (2013.01); *H04L 47/781* (2013.01); *H04L 61/5007* (2022.05)

(58) Field of Classification Search
CPC ... H04L 47/762; H04L 47/781; H04L 47/828; H04L 47/0894; H04L 61/5007;
(Continued)

(56) References Cited

U.S. PATENT DOCUMENTS 9,424,144 B2 8/2016 Sridharan et al.
10,901,768 B1* 1/2021 Mandadi ............ H04L 41/0897
(Continued)

FOREIGN PATENT DOCUMENTS

| CN | 105594166 A | * | 5/2016 | ......... H04L 41/0816 |
| CN | 114553637 A | * | 5/2022 | ......... H04L 12/4641 |
| CN | 117596220 A | * | 2/2024 | ............. H04L 47/32 |

OTHER PUBLICATIONS

Fukai et al., "Live Migration in Bare-Metal Clouds," IEEE Transactions on Cloud Computing, vol. 9, No. 1, Jan.-Mar. 2021. (Year: 2021).*
(Continued)

*Primary Examiner* — Alina A Boutah

(57) ABSTRACT

According to examples, a network control apparatus executes the live migration of a source bare-metal instance backed by a source software defined networking (SDN) appliance to a destination bare-metal instance associated with a destination software defined networking (SDN) appliance while minimizing data path downtime. The network control apparatus initially performs network allocations which include creating a shadow mapping. The network control apparatus triggers a forwarder on the source SDN appliance to forward data packets from network hosts destined for the source bare-metal instance to the destination SDN appliance until live migration is completed or mapping policy is updated. The mapping policy is updated by deleting shadow mapping when the live migration is complete and the source bare-metal instance is de-allocated and removed. The network control apparatus executes the live migration while minimizing the data path downtime so that applications on the destination bare-metal instance may continue to execute with minimal or no interruptions.

20 Claims, 8 Drawing Sheets

(51) Int. Cl.
*H04L 47/762* (2022.01)
*H04L 61/5007* (2022.01)

(58) Field of Classification Search
CPC ... H04L 67/148; H04L 67/34; H04L 67/1095; G06F 9/45558; G06F 2009/45595; G06F 2009/45583; G06F 2009/4557; G06F 2009/45575; G06F 2009/45579
See application file for complete search history.

(56) References Cited

U.S. PATENT DOCUMENTS

| | | | |
|---|---|---|---|
| 11,088,916 B1* | 8/2021 | Chandrashekhar | ............................ H04L 63/0263 |
| 11,102,164 B1 | 8/2021 | Gupta et al. | |
| 11,722,570 B1 | 8/2023 | Deval et al. | |
| 11,928,491 B1* | 3/2024 | Zhang | ...................... G06F 8/63 |
| 2013/0031544 A1 | 1/2013 | Sridharan et al. | |
| 2020/0059485 A1* | 2/2020 | Ergin | ................. H04L 47/2441 |
| 2021/0019270 A1* | 1/2021 | Li | ...................... G06F 13/1668 |
| 2021/0117249 A1* | 4/2021 | Doshi | ..................... G06F 9/547 |
| 2024/0098089 A1* | 3/2024 | Adogla | ............... G06F 9/45558 |
| 2024/0214416 A1* | 6/2024 | Tracy | .................. H04L 63/1425 |

OTHER PUBLICATIONS

Avramidis et al., "Live Migration on ARM-based Micro-datacentres," 2018 15th IEEE Annual Consumer Communications & Networking Conference (CCNC). (Year: 2018).*

"Enabling SDN & Storage Virtualization in Bare-Metal Clouds," Mellanox Technologies, Bluefield, Solution Brief, 2019. (Year: 2019).*

* cited by examiner

LIVE MIGRATION OF BARE-METAL INSTANCES THAT ARE BACKED BY SDN APPLIANCES

BACKGROUND

Some enterprise workloads in cloud network environments include technologies that require special architecture, custom hardware, and/or extraordinarily large sizes. These enterprise workloads would like to apply policies to their packets just as they would for their other resources in the cloud, but these workloads are unable to run a traditional host networking stack because they run on specialized hardware and software, in this case some of these specialized workloads use a Software Defined Networking (SDN) Appliance to enforce such policies by acting as a proxy.

Bare-metal instances are dedicated to a single user/tenant who has full access (root access) to the operating system (OS). A bare-metal instance can combine computing, network, and storage components. Examples of computing components include servers based on processors that provide the necessary computing capability and are certified for specialized workloads. Examples of network components can include a high-speed network fabric interconnecting the computing, storage, and network components. Examples of storage components can include a storage infrastructure accessible via the network fabric. A tenant who leases a bare-metal server can control the OS and application installation as required. For reachability and security, the bare-metal instances are provisioned within the tenant's Virtual Network (VNet) of the cloud network environment on the VNet server IP address range. Accordingly, a bare-metal instance includes resources associated with a single Internet Protocol (IP) address dedicated to a single client or organization.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
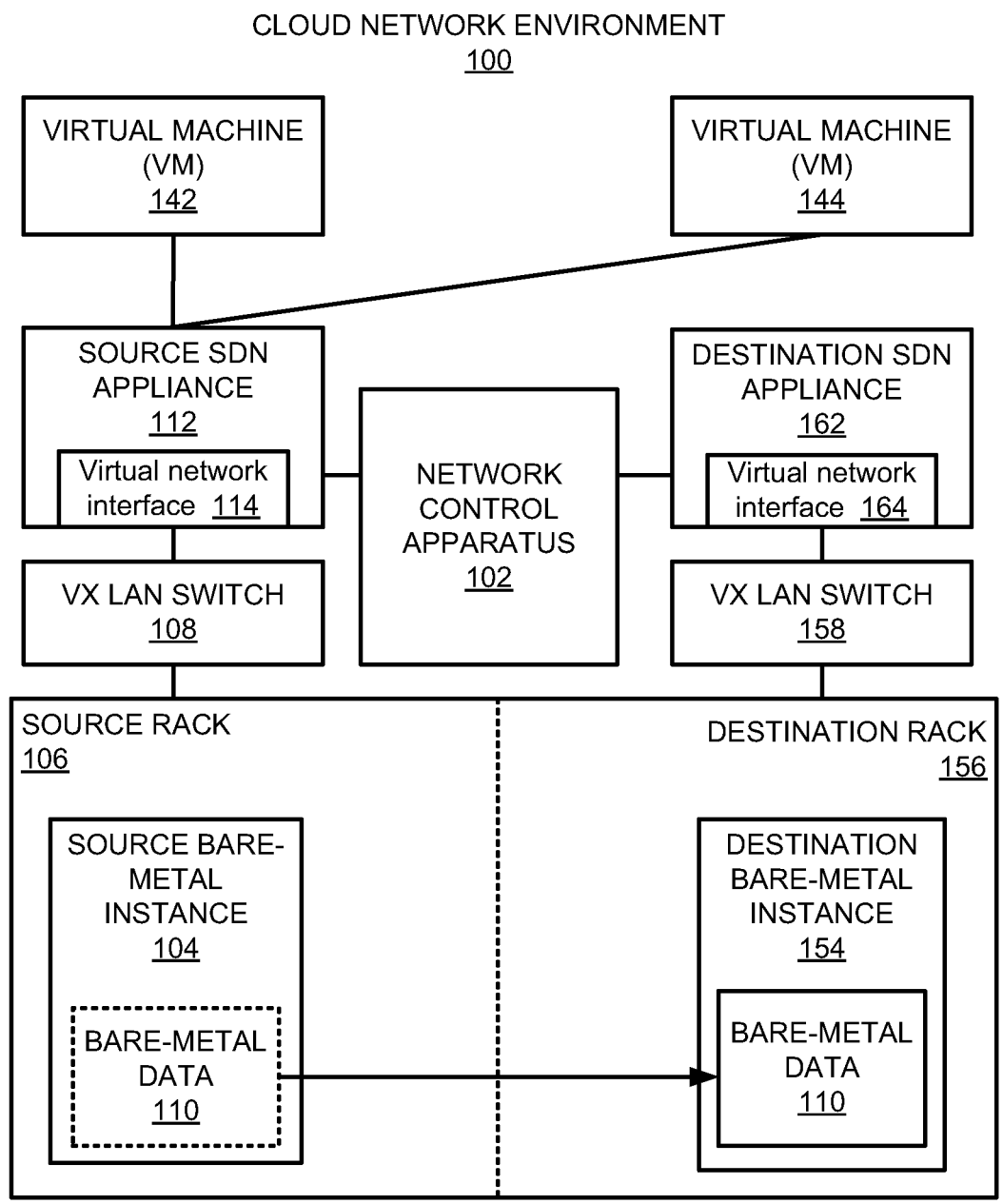
FIG. 1 shows a block diagram of a cloud network environment in which a network control apparatus executes a live migration, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to.

Live migration of bare-metal instances may be implemented for various reasons including but not limited to rack decommissioning, hardware failures, defragmentation, and maintenance. As discussed above, bare-metal instances are typically employed for high-value, mission-critical applications. Therefore, minimization of datapath downtime during the live migration is a highly desirable attribute of a bare-metal infrastructure. Embodiments including a network control apparatus that enables and controls the live migration of bare-metal instances in a cloud network environment, a method of executing the live migration of bare-metal instances and a computer-readable medium having stored thereon processor-executable instructions for the live migration are disclosed herein, which enable minimizing the data path downtime so that applications, such as mission-critical applications, may continue to execute with minimal interruptions.

The network control apparatus in accordance with the disclosed embodiments is communicatively coupled to a source bare-metal instance to be migrated. The network control apparatus initially identifies a destination bare-metal instance to which the source bare-metal instance can be migrated. As bare-metal instances cannot host software defined networking (SDN) policies, the source bare-metal instance and the destination bare-metal instance are each backed by a corresponding SDN appliance, namely, a source SDN appliance and a destination SDN appliance. Each of the SDN appliances/gateways is a disaggregated host that holds the SDN policy for a bare-metal host or Virtual Machines (VMs) in the cloud network environment such that the bare-metal host/VM host is not required to host the SDN policies. The source and destination bare-metal instances are connected to the corresponding Virtual extensible Local-Area Network (VX-LAN) switches that route data packets to the source and destination SDN appliances.

The live migration process is executed in different phases per the disclosed embodiments, in which the phases are carried out in an order that causes minimal disruption (if any) to users of the bare-metal instance being migrated. The phases may include an identification phase during which the network control apparatus identifies the source bare-metal instance that is to be moved and the destination bare-metal instance that is to receive the bare-metal data. The second phase includes a preparation phase during which different policies are created on the destination SDN appliance associated with the destination bare-metal instance and different configurations as detailed herein are set to minimize packet loss for the users of the bare-metal instance. In accordance with an embodiment, the preparation phase involves the network control apparatus allocating a network interface resource on the destination rack, which results in SDN policy creation on the destination SDN appliance. In an example, one of the SDN policies can include the creation of a shadow mapping. The shadow mapping maps a customer address (CA) of the source bare-metal instance to a provider address (PA) of the destination SDN appliance.

The third phase includes a brownout phase during which the network control apparatus initiates copying of the bare-metal data, e.g., the state data from the source bare-metal instance to the destination bare-metal instance. The CA in the original CA: PA mapping still points to the source bare-metal instance so that the traffic is still live on the source bare-metal instance.

The fourth phase includes a blackout phase during which the copying of data is completed and various steps are initiated to mitigate disruption to the network services. During this phase, the network control apparatus disables the source bare-metal instance and triggers a forwarder on the source SDN appliance backing the source bare-metal instance. The forwarder is programmed to forward the packets destined for the source bare-metal instance and arriving at the source SDN appliance to the destination SDN appliance. In an example, the forwarder is programmed to forward packets to the destination SDN appliance until all the instances (e.g., VMs) which interact with the source bare-metal instance have "activated" the shadow mapping by receiving response packets from the destination SDN appliance for packets sent to the source bare-metal instance and thereafter sending the data packets directly to the destination SDN appliance. In an example, the forwarder is programmed to forward packets to the destination SDN appliance until the forwarder is rendered redundant as when the migration has entered the cleanup phase and the original CA: PA mapping is updated so that the CA points to the destination bare-metal instance and the PA points to the destination SDN appliance. Finally, during the cleanup phase, the network control apparatus releases the memory associated with the source bare-metal instance and changes mappings to point to the network elements of the destination rack on completion of the live migration when the entire bare-metal data is copied from the source bare-metal instance to the destination bare-metal instance.

When compared with existing methodologies of implementing live migration of bare-metal instances backed by SDN appliances, the disclosed embodiments optimize the execution of various operations in the different phases to minimize the data path downtime. For example, the existing live migration implementations involve identifying the source bare-metal instance which will be migrated and identifying and allocating the destination bare-metal instance to which the source bare-metal instance will be migrated. However, the destination bare-metal instance is allocated without the corresponding allocation of the required network resources such as the IP address, because the destination instance must receive the same IP address as the source bare-metal instance, and the source bare-metal instance still exists at this stage, i.e., it has not been de-allocated. The tenant's virtual network (VNet) is disconnected from the source bare-metal instance and a snapshot of the instance state is captured. A state copy is initiated from the source bare-metal instance state data to the destination bare-metal instance using a backend network. The source bare-metal instance is then de-allocated, which results in a detached network resource, e.g., an IP resource not associated with any network entity. The dissociated IP resource is then attached to the destination bare-metal instance thereby enabling connectivity. In the aforementioned description, the steps from the disconnection of the tenant's VNet from the source bare-metal instance to the re-attachment of the IP resource to the destination bare-metal instance may result in data path downtime that can last for many minutes during which the cloud network services are unavailable to the tenant.

The disclosed embodiments enable implementing of a live migration of a bare-metal instance that is backed by an SDN appliance in phases optimized for minimal packet loss thereby minimizing data path downtime. For example, the creation of the shadow mapping during the preparation phase enables the destination bare-metal instance to begin communicating with the cloud network environment using the IP resource of the source bare-metal instance prior to the disconnection of the source bare-metal instance. Furthermore, the forwarder on the source SDN appliance enables correct routing of residual data packets that may arrive during or immediately following the live migration when the updated mapping is yet to be received by at least some of the network hosts thereby preventing loss of data packets. These features and other embodiments as detailed infra enable a many-fold reduction in data path downtime occurring during live migration of bare-metal instances backed by SDN appliances, e.g., from minutes to seconds, and in optimized implementations the data path downtime may be reduced to a fraction of a second. The embodiments of live migration disclosed herein reduce the data path downtime to be less than Transmission Control Protocol (TCP) protocol timeouts, so that any data path downtime may not be noticeable to bare-metal customer applications/users.

FIG. 1 shows a diagram of a cloud network environment 100, in which a network control apparatus 102 executes live migration of bare-metal data 110 from a source bare-metal instance 104 to a destination bare-metal instance 154, in accordance with an embodiment of the present disclosure. The source bare-metal instance 104 and the destination bare-metal instance 154 are typically different physical hardware components. In an example, a source rack 106 hosts the source bare-metal instance 104 and a destination rack hosts the destination bare-metal instance 154. Live migration refers to moving a bare-metal and its data, e.g., bare-metal data 110 from one instance, e.g., the source bare-metal instance 104 to another instance, e.g., the destination bare-metal instance 154. Typically this move occurs across two physical racks, e.g., the source rack 106 and the destination rack 156 in a data center within the same region, but it may also occur within the same rack as indicated by the dotted line between the source rack 106 and the destination rack 156. Hence, the destination bare-metal instance 154 can be hosted on the same rack as the source bare-metal instance 104 in an embodiment.

A plurality of bare-metal instances can be dedicated to a single client or organization in an embodiment. However, such a plurality of bare-metal instances may be associated with a single IP address and live migration would involve migrating a plurality of source bare-metal instances associated with the single IP address to one or more destination bare-metal instances. Conversely, a single bare-metal instance can also host multiple tenants and can be associated with multiple IP addresses, and the live migration would involve migrating one or all of the multiple IP addresses from the source to the destination rack. The resources associated with a bare-metal instance may include without limitation, memory, network connectivity, and storage. In an example, live migration involves transferring resources even as the operating system continues to be executed. Only one bare-metal instance is shown under each of the source rack 106 and the destination rack 156 for simplicity but it can be appreciated that more than one bare-metal instance can be connected to a VX-LAN switch and hosted on a single rack.

The network control apparatus 102 is configured to execute the live migration while minimizing the data downtime for the bare-metal instance so that minimal data disruption is perceived by users of the bare-metal instance. The source rack 106 holds the source bare-metal instance 104 and a Virtual extensible Local-Area Network (VX-LAN) switch 108 to route data packets to a Software Defined Networking (SDN) appliance 112. Similarly, the destination rack 156 holds the destination bare-metal instance 154 and a VX-LAN switch 158 associated with a destination SDN appliance 162 and routes data packets to the destination SDN appliance 162. Additionally, virtual network interfaces 114 and 164 are also respectively included on the source rack 106 and the destination rack 156. The virtual network interfaces 114 and 164 are associated with the IP address of the source bare-metal instance 104 and the destination bare-metal instance 154. The virtual network interfaces 114 and 164 are created by a user/customer of the bare-metal instance and contain the policies such as firewall rules, storage/network access, etc., which policies the source bare-metal instance 104 and/or the destination bare-metal instance 154 may enforce as the case may be.

In an embodiment, the source bare-metal instance 104 (and the destination bare-metal instance 154) may refer to a server that is a single-tenant or a multi-tenant physical server. Such custom hardware requires software defined networking (SDN) policies to access the cloud provider's services. However, devices such as a bare-metal server may not have all of the capabilities of a traditional host on a cloud network. For example, the source and destination bare-metal instances 104 and 154 may not be able to execute the host networking stack. SDN appliance capabilities are thereby enhanced in the cloud network environment by disaggregating policy enforcement from the hosts, implementing a middle appliance, which may be referred to herein as an SDN appliance, e.g., the source and destination SDN appliances 112 and 162, and moving the policy enforcement onto the SDN appliances, which are strategically placed in the network. Policies enforced by the source and destination SDN appliances 112 and 162 may include but are not limited to, firewall rules, routing rules, etc. In some embodiments, the source and destination SDN appliances 112 and 162 enable the use of the SDN control plane to manage the network devices. The source and destination SDN appliances 112 and 162 provide a model to separate the application of SDN policies and configurations into a different computation environment. In some embodiments, the source and destination SDN appliances 112 and 162 may each include a Field Programmable Gate Array (FPGA) to move SDN policy enforcement off the host.

The source and destination bare-metal instances 104 and 154 may connect to different virtual machines including another virtual network in the same region for example. In an example, different virtual machines, e.g., VM 142 and VM 144, complete with operating systems capable of running applications may be initially using the source bare-metal instance 104, which the network control apparatus 102 is to migrate.

Figure 2:
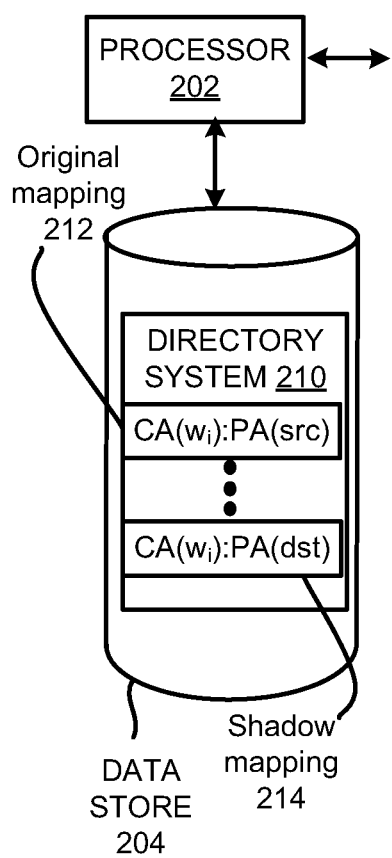
FIG. 2 shows a block diagram of a network control apparatus, in accordance with an embodiment of the present disclosure.
Figure 2:
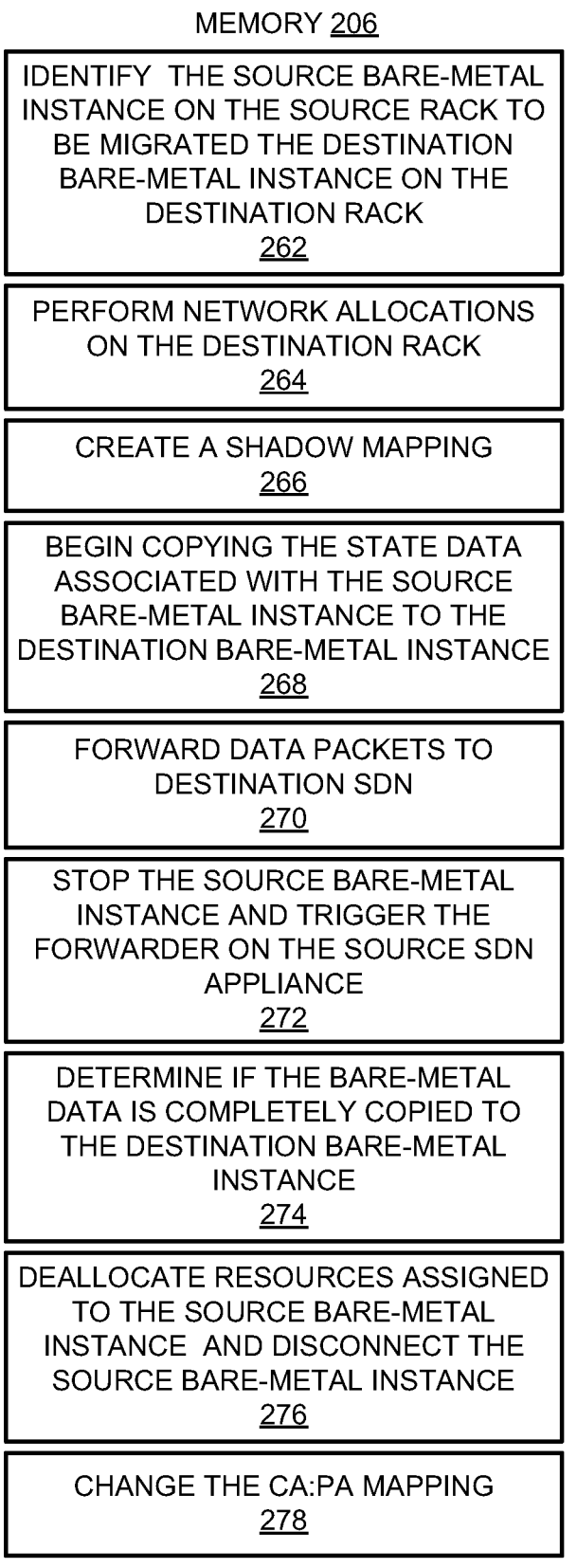

FIG. 2 shows a block diagram of the network control apparatus 102 depicted in FIG. 1, in accordance with an embodiment of the present disclosure. The network control apparatus 102 includes a processor 202 and a memory 206. With particular reference to FIGS. 1 and 2, the memory 206 has stored thereon machine-readable instructions 262-278 that the processor 202 is to execute. Although the instructions 262-278 are described herein as being stored on the memory 206 and thus include a set of machine-readable instructions, the network control apparatus 102 may include hardware logic blocks that may perform functions similar to the instructions 262-278. For instance, the processor 202 may include hardware components that may execute the instructions 262-278. In other examples, the network control apparatus 102 may include a combination of instructions and hardware logic blocks to implement or execute functions corresponding to the instructions 262-278. In any of these examples, the processor 202 may implement the hardware logic blocks and/or execute the instructions 262-278. As discussed herein, the network control apparatus 102 may also include additional instructions and/or hardware logic blocks such that the processor may execute operations in addition to or in place of those discussed above with respect to FIG. 2. The various machine-readable instructions 262-278 of FIG. 2 will be discussed herein with reference to FIGS. 3A-3D, which show the execution details of various instructions.

Figure 3A:
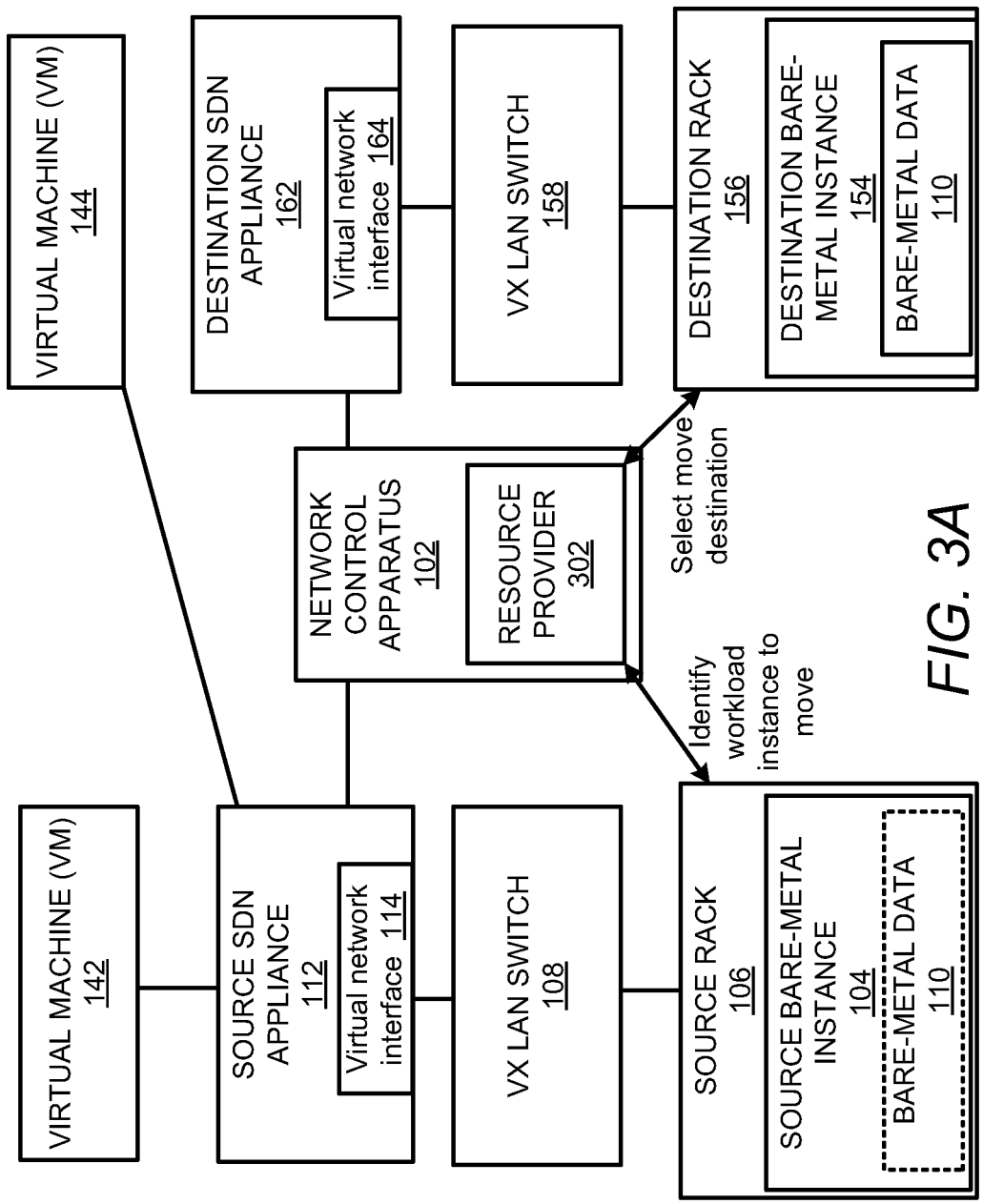
FIG. 3A shows a block diagram of the cloud network environment depicted in FIG. 1, in which a network control apparatus is communicatively coupled to a resource provider, in accordance with an embodiment of the present disclosure.

Live migration may include a migration setup and memory transfer to the destination entity. Generally, during the transfer of state information operations, such as execution of VMs, interruptions may occur and services may resume upon completion of the migration. The instructions 262-278 executed by the processor 202 minimize or eliminate the interruption to services. FIG. 3A shows a block diagram of the cloud network environment 100 depicted in FIG. 1, in which the network control apparatus 102 is communicatively coupled to a resource provider 302, in accordance with an embodiment of the present disclosure. In an embodiment, the resource provider 302 may be included in the network control apparatus 102.

The processor 202 executes instructions 262 via the resource provider 302 to identify the workload instance to be moved and selects the move destination. Accordingly, the resource provider 302 determines that the source bare-metal instance 104 on the source rack 106 is to be migrated to the destination bare-metal instance 154 on the destination rack in addition to moving the bare-metal data 110 from the source bare-metal instance 104 to the destination bare-metal instance 154. Identification of the bare-metal data 110 may involve receiving the IP address of the source bare-metal instance 104 along with the identification data of the source rack 106 and the destination rack 156 if disparate from the source rack 106.

Figure 3B:
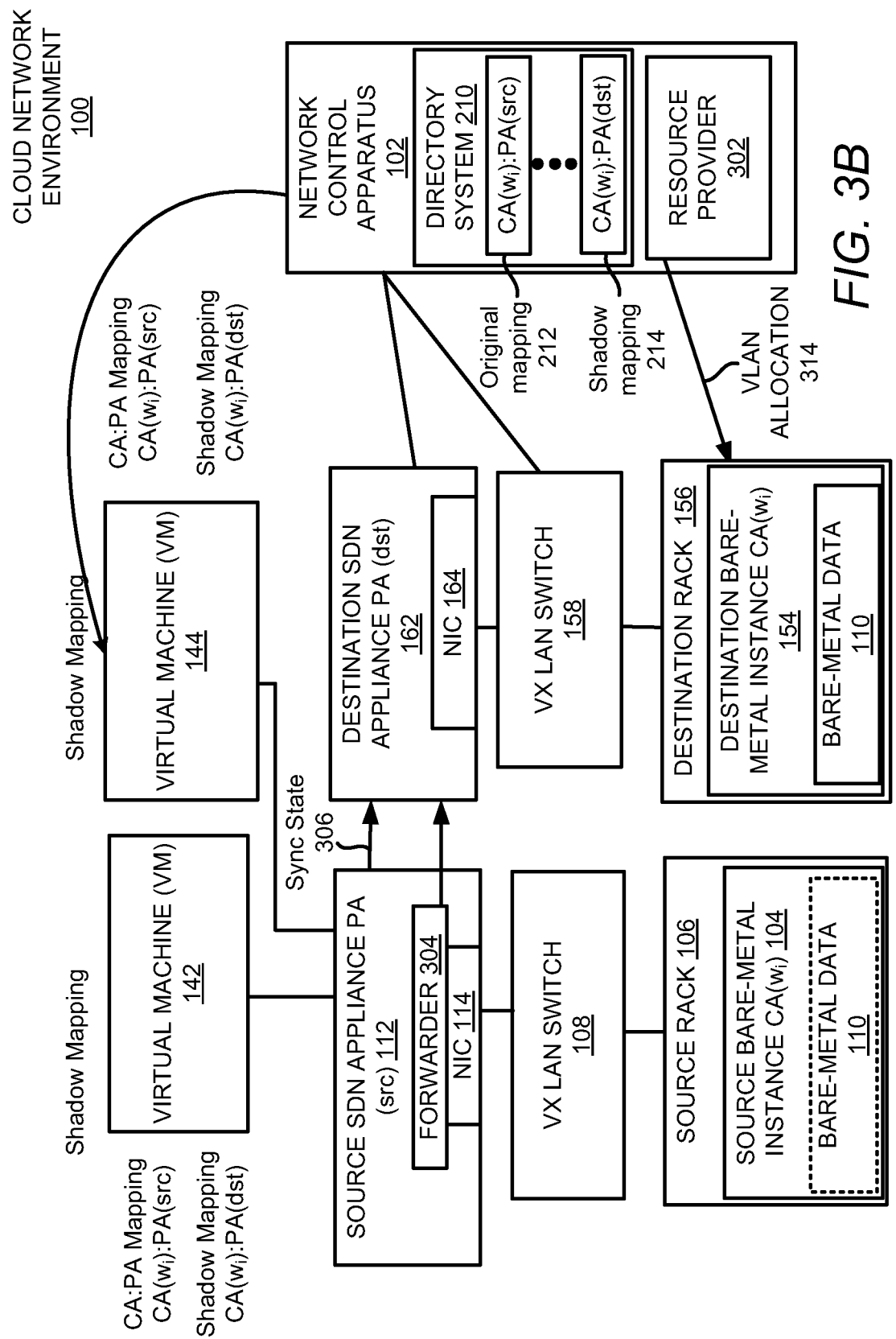
FIG. 3B shows the allocations made by a network control apparatus, in accordance with an embodiment of the present disclosure.

The processor 202 executes instructions 264 to perform certain network allocations on the destination rack 156 while continuing to direct the traffic to the source bare-metal instance 104. FIG. 3B shows the allocations made by the network control apparatus 102 and the resource provider 302 in accordance with an embodiment of the present disclosure. The allocations include the allocation of a network interface resource, e.g., the virtual network interface 164 on the destination rack 156 to be assigned to provide network connectivity to the IP address of the bare-metal data 110. Additional allocations can include provisioning of the VX-LAN switch 158 to direct the traffic associated with the IP address of the destination bare-metal instance 154 to the destination SDN appliance 162 and Virtual Local Area Network (VLAN) creation 314 for the destination bare-metal instance 154. The VLAN information is provided to the destination rack 156 so that the destination bare-metal instance 154 may use the VLAN information for network connectivity.

In order to handle data traffic of the destination bare-metal instance 154, the destination SDN appliance 162 is configured with the policies associated with the destination bare-metal instance 154. SDN policies include without limitation, one or more processes that may be used to determine information about connections. Such information may include whether or not a connection has been completed and tasks that remain for creating or closing the connection. Different time periods, e.g., the waiting time to receive a SYN-ACK (synchronize-acknowledge) packet following sending of a SYN packet, and what to do if the time expires can also be defined in the SDN policies. Through the implementation of the policies on the SDN appliance 162, the destination bare-metal instance 154 is enabled for communication with virtual hosts in various virtual networks (VNets) based on configurations of the cloud network environment 100.

The processor 202 executes instructions 266 to create a shadow mapping 214. The shadow mapping 214 enables interim communication with the destination SDN appliance 162 during the live migration of the source bare-metal instance 104 to the destination bare-metal instance 154. In one embodiment, the cloud network environment 100 uses two different IP address families:

Customer Address: The customer address (CA) is the customer-defined/chosen VNet IP address. The network infrastructure operates using CAs, which are externally routable. All switches including the VX-LAN switches 108, 158, and interfaces, e.g., VIRTUAL NETWORK INTERFACE 114 and 164 are assigned CAs, and implement an IP-based (Layer-3) link-state routing protocol that disseminates these CAs. The CAs remain unaltered regardless of their servers' location changes due to migration or reprovisioning.

Provider address: The provider address (PA) is the assigned internal fabric address of the cloud network environment 100 that isn't visible to users. No traffic goes directly from the Internet to the servers of the cloud network environment 100 including the bare-metal instances 104 and 154. All traffic from the Internet is directed through a Software Load Balancer (SLB) and encapsulated to protect the internal address space of the cloud network environment 100 by only routing packets to valid internal IP addresses and ports.

Each PA is associated with a CA, e.g., the source bare-metal instance 104 and the destination bare-metal instance 154 are connected. A scalable, reliable directory system 210 is used to store and maintain the mapping of PAs to CAs, and this mapping, e.g., original mapping 212 is created when servers are provisioned to a service and assigned PA addresses. Network Address Translation (NAT) separates internal network traffic from external traffic. Internal traffic or private address space of the PAs—isn't externally routable. The translation is performed at the SLBs. CAs that are externally routable are translated into internal PAs that are only routable within the cloud network environment 100. In an example, an agent running in the network stack on every server invokes the directory system's resolution service to learn the actual location of the destination and then tunnels the data packet to the destination.

A CA can therefore correspond to the IP address of a bare-metal data instance, and the provider address PA can correspond to the physical location of the bare-metal instance. The PA changes as a result of live migration, whereas the CA remains fixed. Before the live migration, the customer address ($CA(w_i)$), which is the IP address of the source bare-metal instance 104, is mapped to the PA of the source SDN appliance 112 (PA(src)) as shown at the original mapping 212. In the shadow mapping 214, the customer address ($CA(w_i)$) of the bare-metal data 110 is mapped to the provider address of the destination SDN appliance (PA (dest)).

The processor 202 executes instructions 268 to begin copying the state data associated with the source bare-metal instance 104 to the destination bare-metal instance 154. The connection state (referred to as 'state') corresponds to a state of the SDN policies and in conjunction with the state of the connection between two endpoints, e.g., the source bare-metal instance 104 and the destination bare-metal instance 154. The state may include whether or not the connection is being established, is already established, is being used to transfer packets, and other information related to the connection. Other state data can include the time to live (TTL) of the connection and may contain necessary packet transformations for the source SDN appliance 162 and the destination SDN appliance 162 to process packets. The state data may also reflect the state of other connection-oriented and connectionless protocols in other examples. In an embodiment, the connection establishment process referred to as a three-way handshake can be utilized to copy the state data which results in the source SDN appliance 112 and the destination SDN appliance 162 being the primary SDN appliances for the connection between the source rack 106 and the destination rack 156. In addition, a copy of the state during the connection establishment can be maintained at a secondary SDN appliance (not shown). This allows the secondary SDN appliance to be a hot spare and become a primary should the connection failover. The copying of stateful information from the source SDN appliance 112 and the destination SDN appliance 162 may occur until the forwarder 304 is programmed. After the forwarder 304 is programmed, all the traffic from the source SDN appliance 112 may statelessly be sent to the destination SDN appliance 162, and the destination SDN appliance 162 may enforce the statefullness for the packets.

The processor 202 executes instructions 270 to forward data packets to the destination SDN appliance 162. In an example, the forwarder 304 is implemented programmatically to forward from the source SDN appliance 112 to the destination SDN appliance 162, data traffic. The data traffic includes data packets of the source bare-metal instance 104 which are initially received after the source bare-metal instance 104 is disabled. The destination SDN appliance 162 can therefore begin receiving the data traffic for the source bare-metal instance 104 being migrated. The traffic from any of the VMs, e.g., VM 142, to the source bare-metal instance 104 is forwarded to the destination SDN appliance 162 which will then send the traffic down the VX-LAN switch 158 to the destination bare-metal instance 154. The data packets may be forwarded until all of the instances that interact with the source bare-metal instance 104 "activate" the shadow mapping, e.g., have some data packets received from the destination SDN appliance 162, thereby activating the shadow policy and directly sending data packets to the destination SDN appliance 162. When the source SDN Appliance 112 receives no packets for x amount of time, the forwarder may be disabled. Alternatively, the data packets may be forwarded until the migration has entered the cleanup phase, after which the real mapping is updated with the destination SDN appliance 162 such that the forwarder is no longer needed.

A data packet such as an acknowledgment (ACK) packet from the destination bare-metal instance 154 is sent via the VX-LAN switch 158 to the destination SDN appliance which transmits the ACK packet to the VM 142 per the stored SDN policies. As a result of creating the shadow mapping 214 during the preparation phase, any data packets that are sent from the destination SDN appliance 162 to a virtual network host, e.g., one of the VMs 142, 144, will be allowed. The VM 142 may not initially recognize the PA(dst) of the ACK packet from the destination bare-metal instance 154 and performs a lookup. During the lookup, the VM 142 accesses the shadow mapping 214 thereby identifying the originator of the ACK packet. Once the VM 142 accesses the shadow mapping 214, the VM 142 forwards subsequent packets directly to the destination SDN appliance 162 until an updated mapping is circulated. After the circulation of the updated mapping, the packets may continue to be transmitted to the destination SDN appliance 162. However, after the circulation of the updated mapping, the packets may be directed per the updated CA: PA mapping rather than the shadow mapping 214.

Furthermore, when the virtual network host, e.g., VM 142, initially receives the data packets from the destination SDN appliance 162, the CA will not match any of the existing mapping policies resulting in a lookup that identifies the shadow mapping 214. At this point, another virtual machine, e.g., VM 144 may request a transmission of an updated mapping policy in response to receiving a data packet from the destination bare-metal instance 154, which does not match any of the existing mappings. These embodiments perform reactive policy updating according to a "lazy pull" technique. The data traffic from the virtual network hosts is still directed towards the source SDN appliance 112 at this point per the original mapping 212. Hence, the forwarder 304 and the shadow mapping 214 result in a triangular route in which data packets from the virtual network hosts destined for the source bare-metal instance 104 (now migrated to the destination bare-metal instance 154) go to the source SDN appliance 112 from where they are forwarded to the destination SDN appliance 162. Conversely, any data packets originating at the destination bare-metal instance 154 are routed via the destination SDN appliance 162 directly to the virtual network hosts. After the lazy pull is done, the shadow mapping 214 is activated, and the triangle routing will not occur. The data packets will be directly routed to the destination SDN appliance 162 as opposed to being transmitted via the triangle route through the source SDN appliance 112.

Figure 3C:
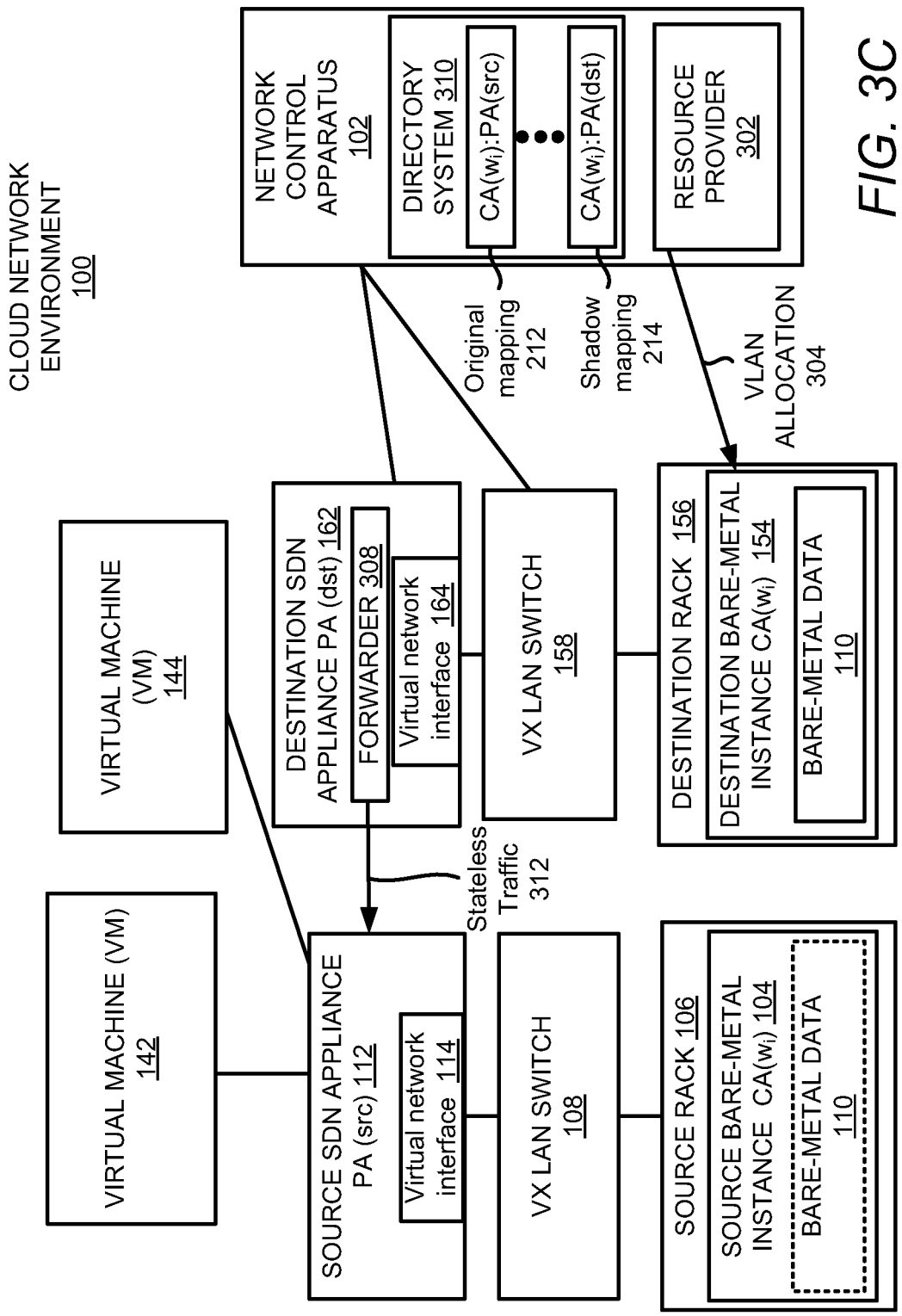
FIG. 3C shows an implementation of a forwarder on a destination software defined networking (SDN) appliance, in accordance with an embodiment of the present disclosure.

Two methods may be utilized to handle stateful flows associated with certain kinds of data traffic. Synchronizing state data is required when a certain sequence of packets (e.g., SYN followed by SYN ACK and SYN) are expected based on firewall rules, and data packets transmitted in violation of such rules are blocked by the firewall. Synchronizing states between the source SDN appliance 112 and the destination SDN appliance 162 enables the destination SDN appliance 162 to receive data packets in the middle of a flow that are out of the expected sequence. The first method includes maintaining a copy of the state data during the connection establishment at a secondary SDN appliance as described above to synchronize state 306 from the source SDN appliance 112 to the destination SDN appliance in a special sync mechanism set up for a short period. A second method is shown in FIG. 3C, which involves programming a forwarder 308 on the destination SDN appliance 162, in accordance with certain embodiments. The forwarder 308 forwards all the traffic from the destination SDN appliance 162 to the source SDN appliance 112 and the destination SDN appliance 162 passes the stateless traffic 312, e.g., the traffic passes through without enforcing statefulness, allowing the source SDN appliance 112 to enforce the required statefulness. For the destination SDN appliance 162 to get the required flow state, the destination SDN appliance 162 learns the flows from the ongoing data flows, such that a seamless final traffic switchover is made possible during cleanup. The destination SDN appliance 162 may learn the network state by inspecting the packets coming in and going out, since both incoming and outgoing packets are seen by the destination SDN appliance 162, the destination SDN appliance 162 may learn the packet state.

Figure 3D:
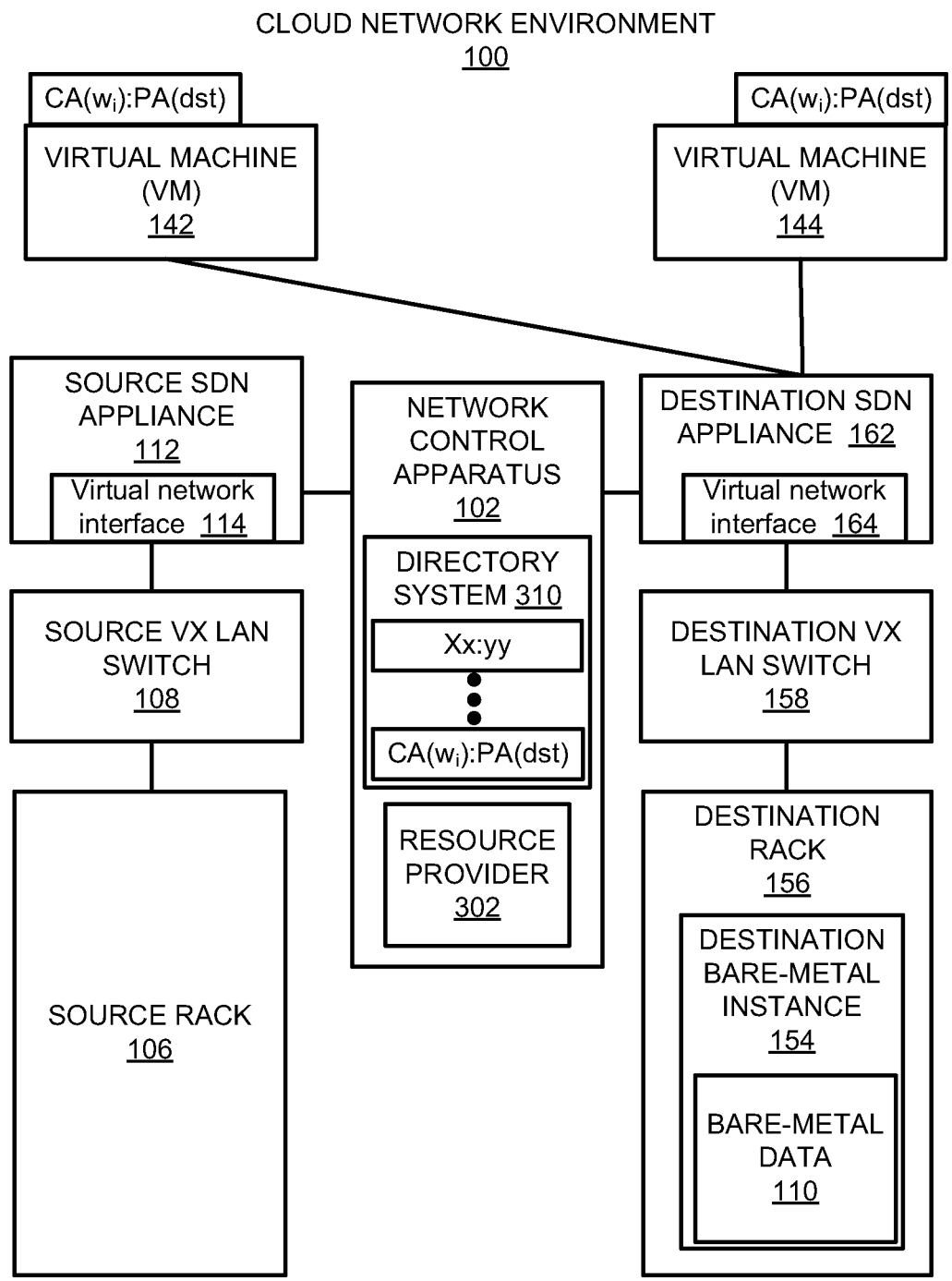
FIG. 3D shows an embodiment of the cloud network environment depicted in FIG. 1 after a clean-up operation, in accordance with an embodiment of the present disclosure.

The processor 202 executes instructions 274 to determine if the bare-metal data has been completely copied to the destination bare-metal instance 154. When it is determined that copying of the bare-metal data 110 to the destination bare-metal instance 154 is completed, clean-up operations are commenced under phase five of the live migration. FIG. 3D shows an embodiment of the cloud network environment 100 after the clean-up operation, in accordance with an embodiment of the present disclosure. As part of the cleanup operation, the processor 202 executes instructions 276 to enable the resource provider 302 to deallocate resources assigned to the source bare-metal instance 104 on the source rack 106 and disconnect the source bare-metal instance 104 from the cloud network environment 100. The processor 202 executes instructions 278 to change the CA: PA mapping. In particular, the shadow mapping 214 is deleted and the original mapping 212 is amended so that $CA(w_i)$, which is now the customer address of the destination bare-metal instance 154 is mapped to the PA(dst), which is the destination SDN appliance 162. At this stage, the traffic is still in an interim state such that some traffic meant for the destination bare-metal instance 154 may still be received at the source SDN appliance 166. Hence, while the mappings are in the process of being updated, the forwarder 304 on the virtual network interface 114 of source SDN appliance 112 is still kept in operation and not cleaned up. When traffic for the destination bare-metal instance 154 stops arriving at the source SDN appliance 112, the network resource, e.g., the virtual network interface 114, the source SDN appliance 112, and the Virtual Routing and Forwarding (VRF) routing table associated with the source bare-metal instance 104 on the source VX-LAN switch 108 are cleaned up at this state, and the live migration is considered as completed.

With respect to FIGS. 1, 2, and 3A-3D, each of the various processors including the processor 202, is a semiconductor-based microprocessor, a central processing unit (CPU), an application-specific integrated circuit (ASIC), a field-programmable gate array (FPGA), and/or other hardware device. The memory 206, may also be termed a computer-readable medium and is, for example, a Random Access memory (RAM), an Electrically Erasable Programmable Read-Only Memory (EEPROM), a storage device, or the like. In some examples, each of the memory 206 is a non-transitory computer-readable storage medium, where the term "non-transitory" does not encompass transitory propagating signals. In any regard, the memory 206 has stored thereon machine-readable instructions executable respectively by processor 202. Similarly, the data store 204 may also be a Random Access memory (RAM), an Electrically Erasable Programmable Read-Only Memory (EEPROM), a storage device, or the like.

Although the network control apparatus 102 is depicted as having a single processor it should be understood that the network control apparatus 102 may each include additional processors and/or cores without departing from the scope of the disclosed embodiments. In this regard, references to a single processor 202, as well as to a single memory 206 may be understood to additionally or alternatively pertain to multiple processors 202, and/or multiple memories 206. In addition, or alternatively, the processor 202 and the memory 206 may be integrated into a single component, e.g., an integrated circuit on which both the processor 202 and the memory 206 may be provided. In addition, or alternatively, the operations described herein as being performed by the processor 202 can be distributed across multiple corresponding network control apparatuses 102 and/or multiple processors 202.

Figure 4:
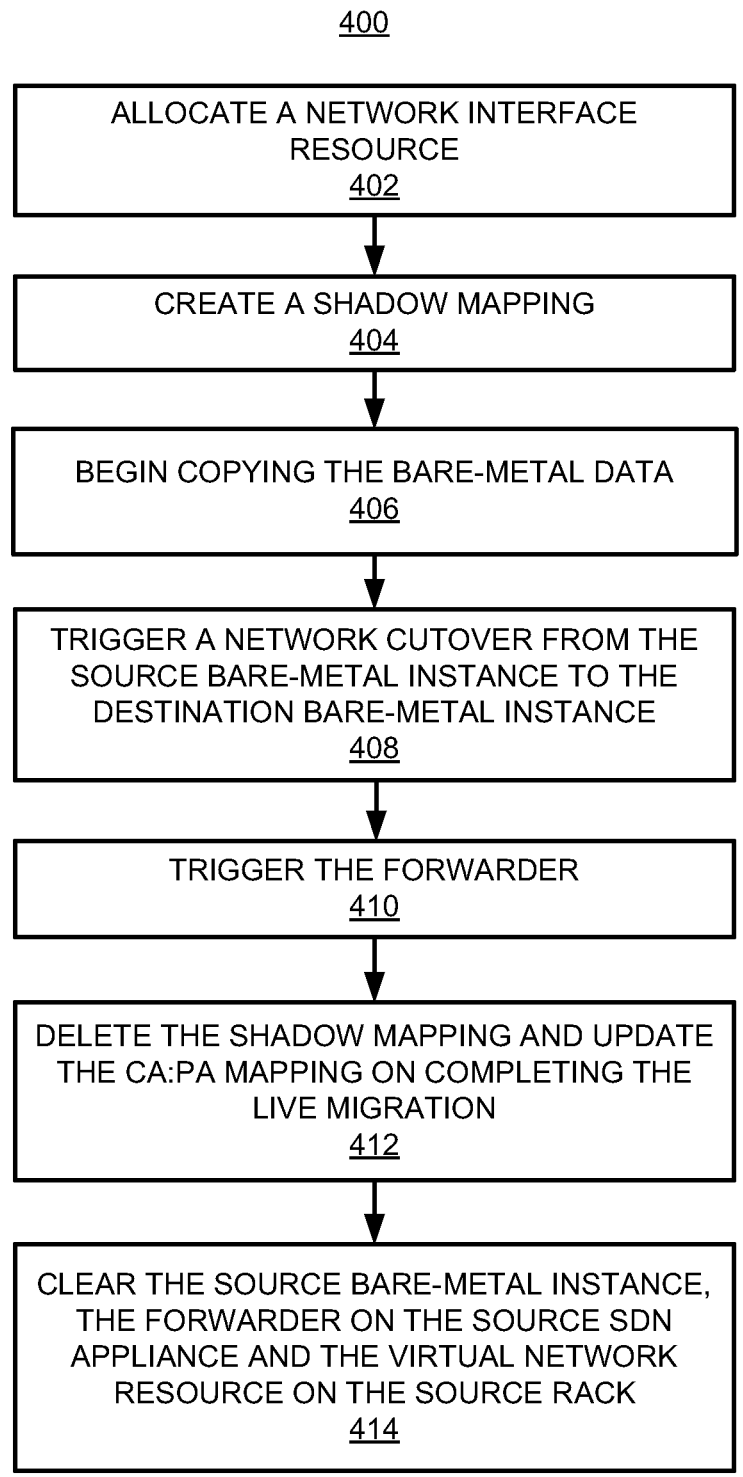
FIG. 4 depicts a flow diagram of a method of implementing live migration of a bare-metal instance, in accordance with an embodiment of the present disclosure.

Various manners in which the processor 202 of the network control apparatus 102 operates are discussed in greater detail with respect to the method 400 depicted in FIG. 4. Particularly, FIG. 4 depicts a flow diagram of a method 400 of implementing live migration of the source bare-metal instance 104 to the destination bare-metal instance 154, in accordance with embodiments of the present disclosure. It should be understood that the method 400 may include additional operations and that some of the operations described therein may be removed and/or modified without departing from the scope of the method 400. The description of the method 400 is made with reference to the features depicted in FIGS. 1 through 3D for purposes of illustration.

At block 402, the processor 202 allocates a network interface resource, e.g., the virtual network interface 164 on the destination SDN appliance 162 associated with the destination bare-metal instance 154 during a live migration of at least one source bare-metal instance, e.g., the source bare-metal instance 104 to the destination bare-metal instance 154. In an example, the source bare-metal instance 104 can include a plurality of source bare-metal instances that are associated with a single Internet Protocol (IP) address and the live migration includes migrating all the resources associated with the IP address. At block 404, the processor 202 creates the shadow mapping 214 that maps the CA of the source bare-metal instance 104 ($CA(w_i)$) to the PA of the destination SDN appliance 162 (PA(dst)). At block 406, the processor 202 begins copying the bare-metal data 110 from the source bare-metal instance 104 to the destination bare-metal instance 154. At block 408, the processor 202 determines that it is ready to trigger a blackout/cutover from the source bare-metal instance to the destination bare-metal instance 154. A network cutover refers to the physical or logical change of the running network, e.g., migration of devices.

At block 410, the processor 202 triggers the forwarder 304 on the source SDN appliance 112. The forwarder 304 is programmed to forward packets destined for the source bare-metal instance 104 and arriving at the source SDN appliance 112 to the destination SDN appliance 162. In an example, the forwarder 304 can be programmed to forward or route packets to the destination SDN appliance 162 until all the instances (e.g., VMs) which interact with the source bare-metal instance 104 have "activated" the shadow mapping 214 by receiving response packets from the destination SDN appliance 162 for packets sent to the source bare-metal instance 104 and the data packets are thereafter sent directly to the destination SDN appliance 162. In an example, the forwarder 304 can be programmed to forward packets to the destination SDN appliance 162 until the migration has entered the cleanup phase and the original CA: PA mapping is updated so that the CA points to the destination bare-metal instance 162 and the PA points to the destination SDN appliance 162. At block 412, the processor 202 deletes the shadow mapping, based on the completion of live migration of the source bare-metal instance 104 to the destination bare-metal instance 154. Furthermore, the processor 202 maps the customer address (CA) of the destination bare-metal instance 154 to a provider address (PA) of the destination SDN appliance 162. In an example, the deletion of the shadow mapping 214 and updating of the original mapping so that the customer address of the destination bare-metal instance 154 CA(wi) is mapped to the provider address of the destination SDN appliance PA(dst) can happen in a single operation. At block 414, the source bare-metal instance 104, the virtual network resource 114 and the forwarder on the source SDN appliance 112 are cleared from the source rack 106.

In some examples, some or all of the operations set forth in the method 400 are included as utilities, programs, or subprograms, in any desired computer-accessible medium. In some examples, the method 400 is embodied by computer programs, which may exist in a variety of forms both active and inactive. For example, the computer programs exist as machine-readable instructions, including source code, object code, executable code, or other formats. Any of the above, in some examples, are embodied on a non-transitory computer-readable storage medium.

Figure 5:
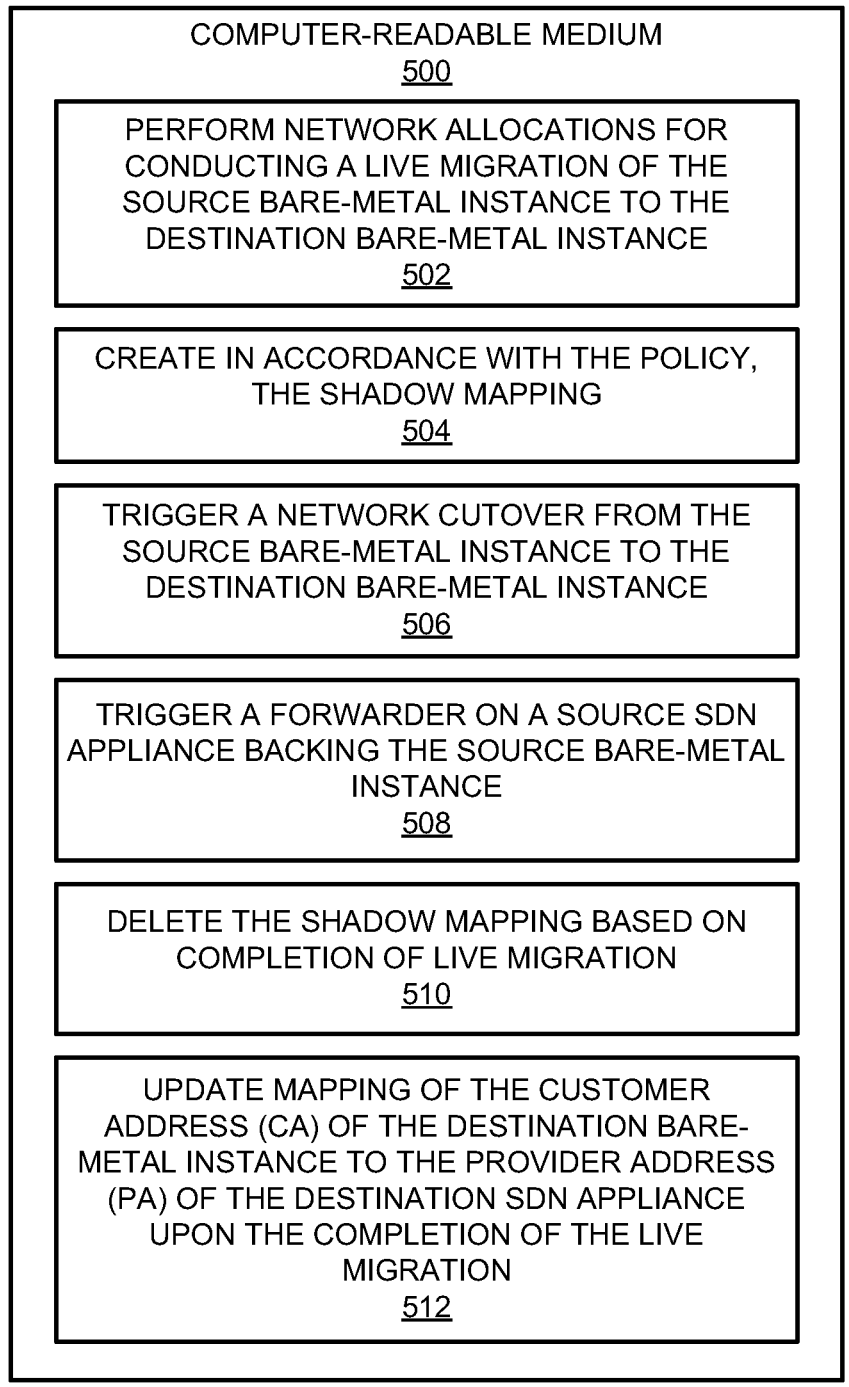
FIG. 5 shows a block diagram of a computer-readable medium that has stored thereon computer-readable instructions for controlling live migration, in accordance with an embodiment of the present disclosure.

Turning now to FIG. 5, there is shown a block diagram of a computer-readable medium 500 that has stored thereon computer-readable instructions for controlling live migration in the cloud network environment 100 by the network control apparatus 102, in accordance with an embodiment of the present disclosure. It should be understood that the computer-readable medium 500 depicted in FIG. 5 may include additional instructions and that some of the instructions described herein may be removed and/or modified without departing from the scope of the computer-readable medium 500 disclosed herein. In some examples, the computer-readable medium 500 is a non-transitory computer-readable medium, in which the term "non-transitory" does not encompass transitory propagating signals.

As shown in FIG. 5, the computer-readable medium 500 has stored thereon computer-readable instructions 502 that a processor, such as a processor 202 of the network control apparatus 102 depicted in FIGS. 1 and 2, executes. The computer-readable medium is an electronic, magnetic, optical, or other physical storage device that contains or stores executable instructions. The computer-readable medium 500 is, for example, Random Access memory (RAM), an Electrically Erasable Programmable Read-Only Memory (EEPROM), a storage device, an optical disc, and the like.

The processor executes the instructions 502 to perform network allocations for conducting a live migration of the source bare-metal instance 104 to the destination bare-metal instance 154. The network allocations create at least one policy on the destination SDN appliance 162 associated with the destination bare-metal instance.

The processor executes instructions 504 to create, in accordance with the policy, the shadow mapping 214 that maps a customer address (CA) of the source bare-metal instance to a provider address (PA) of the destination SDN appliance 162.

The processor executes instructions 506 to trigger a network cutover from the source bare-metal instance 104 to the destination bare-metal instance 154 and the network cutover is ready to be triggered.

The processor executes instructions 508 to trigger the forwarder 304 on the source SDN appliance 112 backing the source bare-metal instance 104.

The processor executes instructions 5510 to delete the shadow mapping 214 based on completion of live migration of the source bare-metal instance 104 to the destination bare-metal instance 154.

The processor executes instructions 512 to update the mapping of the customer address (CA) of the destination bare-metal instance 154 to the provider address (PA) of the destination SDN appliance 162 upon the completion of the live migration.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A network control apparatus comprising:
   a processor; and
   a memory on which is stored machine-readable instructions that when executed by the processor, cause the processor to:
      perform network allocations for conducting a live migration of a source bare-metal instance to a destination bare-metal instance, wherein the network allocations create at least one policy on a destination SDN appliance associated with the destination bare-metal instance;
      create, in accordance with the at least one policy, a shadow mapping that maps a customer address (CA) of the source bare-metal instance to a provider address (PA) of the destination SDN appliance;
      trigger a forwarder on a source SDN appliance backing the source bare-metal instance, wherein the forwarder forwards data packets received from at least one network host destined for the source bare-metal instance after the source bare-metal instance is disabled to the destination SDN appliance;
      route data packets, received from the at least one network host after activation of the shadow mapping by the at least one network host, directly to the destination SDN appliance; and
      update at least one policy by deleting the shadow mapping based on completion of the live migration of the source bare-metal instance to the destination bare-metal instance.

2. The network control apparatus of claim 1, wherein, to perform network allocations, the instructions cause the processor to:
   allocate a network interface resource on the destination SDN appliance; and
   create a Virtual extensible Local-Area Network (VXLAN) switch configuration and Virtual Local-Area Network (VLAN) on a rack hosting the destination bare-metal instance.

3. The network control apparatus of claim 1, wherein the instructions further cause the processor to:
   transmit at least one response data packet from the destination SDN appliance to the at least one network host sending the data packets to the source SDN appliance, wherein the at least one response data packet includes the provider address of the destination SDN appliance.

4. The network control apparatus of claim 3, wherein the instructions further cause the processor to:
   receive a request for an updated mapping policy from the at least one network host in response to transmission of the at least one response data packet; and
   transmit the shadow mapping to the at least one network host in response to receipt of the request for the updated mapping policy.

5. The network control apparatus of claim 1, wherein the instructions further cause the processor to:
   trigger the forwarder on the source SDN appliance following the source bare-metal instance being disabled, wherein the forwarder continues to forward packets until the shadow mapping is activated by one or more network hosts including the at least one network host communicating with the source bare-metal instance or until the at least one policy is updated.

6. The network control apparatus of claim 5, wherein the instructions further cause the processor to:
   trigger a network cutover from the source bare-metal instance to the destination bare-metal instance when requisite data is copied and a networking cutover is ready to be triggered.

7. The network control apparatus of claim 6, wherein the instructions further cause the processor to:
   enforce stateful flows and prevent stateful flow drop by programming traffic including data packets as stateless for a short duration by programming a forwarder on the destination SDN appliance, wherein the forwarder on the destination SDN appliance transmits traffic originating at the destination SDN appliance as stateless traffic to the source SDN appliance that enforces required statefulness on the stateless traffic; and
   enable the destination SDN appliance to learn required state for flows passing through the network.

8. The network control apparatus of claim 6, wherein the instructions further cause the processor to:
   enforce stateful flows by copying stateful information from the source SDN appliance to the destination SDN appliance.

9. The network control apparatus of claim 8, wherein the instructions for updating the at least one policy, on completion of the live migration, further cause the processor to:
   map a customer address (CA) of the destination bare-metal instance to the provider address (PA) of the destination SDN appliance, wherein the CA of the destination bare-metal instance is an Internet Protocol (IP) address of the source bare-metal instance.

10. The network control apparatus of claim 9, wherein the instructions further cause the processor to:
    deallocate network resources assigned to the source bare-metal instance.

11. The network control apparatus of claim 1, wherein the source bare-metal instance is hosted on a source rack and the destination bare-metal instance is hosted on a destination rack disparate from the source rack.

12. The network control apparatus of claim 11, wherein the instructions further cause the processor to:

identify, prior to performing the network allocations, the source rack including the source bare-metal instance, and the destination rack including the destination bare-metal instance.

13. A method comprising:

allocating, by a processor, a network interface resource on a destination SDN appliance associated with a destination bare-metal instance during a live migration of at least one source bare-metal instance to the destination bare-metal instance;

creating, by the processor, a shadow mapping that maps a customer address (CA) of the at least one source bare-metal instance to a provider address (PA) of the destination SDN appliance;

triggering, by the processor, a forwarder programmed on a source SDN appliance backing the at least one source bare-metal instance, wherein the forwarder forwards data packets from at least one network host for the at least one source bare-metal instance received after the at least one source bare-metal instance is disabled, to the destination SDN appliance;

routing, by the processor, data packets received from at least one network host after activation of the shadow mapping by the at least one network host, directly to the destination SDN appliance; and deleting, by the processor, the shadow mapping, based on completion of live migration of the at least one source bare-metal instance to the destination bare-metal instance.

14. The method of claim 13, wherein the at least one source bare-metal instance includes a plurality of source bare-metal instances.

15. The method of claim 14, wherein the plurality of the source bare-metal instances are associated with a single Internet Protocol (IP) address.

16. The method of claim 15, further comprising:

identifying, by the processor prior to the allocation, a source rack including the plurality of source bare-metal instances and a destination rack including the destination bare-metal instance.

17. The method of claim 13, further comprising:

mapping, by the processor on completion of the live migration, a customer address (CA) of the destination bare-metal instance to a provider address (PA) of the destination SDN appliance.

18. A non-transitory computer-readable medium on which is stored a plurality of instructions that when executed by a processor, cause the processor to:

perform network allocations for conducting a live migration of a source bare-metal instance to a destination bare-metal instance, wherein the network allocations create at least one policy on a destination SDN appliance associated with the destination bare-metal instance;

create, in accordance with the at least one policy, a shadow mapping that maps a customer address (CA) of the source bare-metal instance to a provider address (PA) of the destination SDN appliance; trigger a forwarder on a source SDN appliance backing the source bare-metal instance, wherein the forwarder, forwards data packets from at least one network host destined for the source bare-metal instance received after the source bare-metal instance is disabled to the destination SDN appliance;

route data packets, received from the at least one network host after activation of the shadow mapping by the at least one network host, directly to the destination SDN appliance; and update the at least one policy by deleting the shadow mapping, based on completion of live migration of the source bare-metal instance to the destination bare-metal instance.

19. The non-transitory computer-readable medium of claim 18, wherein the instructions further cause the processor to:

cause the forwarder to continue the forwarding of the data packets until the shadow mapping is activated by one or more network hosts including the at least one network host communicating with the source bare-metal instance and until the at least one policy is updated across the network.

20. The non-transitory computer-readable medium of claim 19, wherein the instructions to update the at least one policy further cause the processor to:

update mapping of a customer address (CA) of the destination bare-metal instance to the PA of the destination SDN appliance upon the completion of the live migration.

\* \* \* \* \*